(12) United States Patent
Ben-Artzi et al.

(10) Patent No.: US 8,745,573 B2
(45) Date of Patent: Jun. 3, 2014

(54) PLATFORM-INDEPENDENT APPLICATION DEVELOPMENT FRAMEWORK

(75) Inventors: Guy Ben-Artzi, Palo Alto, CA (US); Yotam Shacham, Palo Alto, CA (US); Yehuda Levi, Rishon Lezion (IL); Russell William Mcmahon, Woodside, CA (US); Amatzi Ben-Artzi, Palo Alto, CA (US); Alexei Alexevitch, Hertzlia (IL); Alexander Glyakov, Petach Tikva (IL); Tal Lavian, Sunnyvale, CA (US)

(73) Assignee: Beek Fund B.V. L.L.C., Dover, DE (US)

( * ) Notice: Subject to any disclaimer, the term of this patent is extended or adjusted under 35 U.S.C. 154(b) by 1006 days.

(21) Appl. No.: 12/483,598

(22) Filed: Jun. 12, 2009

(65) Prior Publication Data

US 2009/0313004 A1 Dec. 17, 2009

Related U.S. Application Data

(60) Provisional application No. 61/132,211, filed on Jun. 16, 2008.

(51) Int. Cl.
*G06F 9/44* (2006.01)

(52) U.S. Cl.
USPC .............. 717/102; 717/106; 717/140

(58) Field of Classification Search
USPC ...................................... 717/102, 6
See application file for complete search history.

(56) References Cited

U.S. PATENT DOCUMENTS

| 2002/0184610 | A1* | 12/2002 | Chong et al. | 717/109 |
| 2003/0070061 | A1* | 4/2003 | Wong et al. | 712/220 |
| 2006/0129972 | A1* | 6/2006 | Tyburski et al. | 717/106 |
| 2009/0254912 | A1* | 10/2009 | Roundtree et al. | 718/102 |

\* cited by examiner

*Primary Examiner* — Li B Zhen
*Assistant Examiner* — Duy Khuong Nguyen
(74) *Attorney, Agent, or Firm* — Novak Druce Connolly Bove + Quigg LLP

(57) ABSTRACT

Embodiments of the invention provide a platform-independent application development framework for programming an application. The framework comprises a content interface configured to provide an Application Programming Interface (API) to program the application comprising a programming code to be executed on one or more platforms. The API provided by the framework is independent of the one or more platforms. The framework further comprises an application environment configured to provide an infrastructure that is independent of the one or more platforms and one or more plug-in interfaces configured to provide an interface between the application environment and the one or more platforms.

15 Claims, 8 Drawing Sheets

PLATFORM-INDEPENDENT APPLICATION DEVELOPMENT FRAMEWORK

CROSS-REFERENCE TO RELATED APPLICATION

This application draws priority from U.S. Provisional Patent Application No. 61/132,211, filed on Jun. 16, 2008, and hereby incorporated by reference herein in its entirety.

FIELD OF THE INVENTION

The teaching herein generally relates to application development framework and more specifically to platform independent development framework for applications.

BACKGROUND OF THE INVENTION

Various users across the globe communicate or perform various activities on computer and device networks. Moreover, the users interact with each other through the networks, such as the Internet. Typically, devices like personal computers are used by the users to interact over the Internet. The users can interact from various Internet websites or social networking sites, for example, Facebook, Myspace, Hi5, and Orkut etc. Recently, the development in mobile devices such as cell phones, smartphones and PDAs, computers, laptops and the like has enabled them to be used for performing various activities on networks such as the Internet. Moreover, the mobile devices can be used for real-time interaction with other users on the network. The interaction or communication can be in the form of chatting, playing interactive online games, browsing, shopping, music, video, banking, business and the like.

The rapid pace of innovation in technology has generated various types of devices and platforms. Moreover, the number of devices is increasing rapidly. For example, there are various operating systems available for the devices such as Windows, Linux, Macintosh, and Symbian, etc. Moreover, a large number of J2ME platforms are available for the mobile devices such as cell phones. Furthermore, the mobile devices have a wide rage of capabilities in terms of screen size, screen type, screen resolution, processor, and memory etc. The applications for these devices have to be developed based on their platforms. As a result, each application has to be developed based on each platform or ported to other platforms. For example, in case of computer games the programming languages typically used are JAVA, C#, C++, Action Script, and the like. Therefore, an application developed in Action Script programming language may have to be ported to other programming language when not supported by a device platform.

Typically, the programming code of an application is translated manually from one programming language to another. However, manual translation requires specific and in-depth knowledge of the programming languages of the different operating systems. Moreover, manual translation is a very time consuming process. Furthermore, the programming languages are constantly developed or get modified. Moreover, the applications have to be developed on specific development platforms compatible with the programming language used for development and the operating system of a device. Therefore, knowledge of specific tools and Application Programming Interface (API) for every device platform may be required to program an application. Some existing mechanisms, such as emulation of applications and virtual machines are available to support applications on multiple devices.

In case of virtual machine mechanisms the programming code of the application is separated into platform independent code and platform dependent code. Platform independent code is written in the virtual machine's coding language, which usually is a scripting language. Further, the code may be compiled to a binary that only the virtual machine itself knows how to execute. Since the code is never compiled to a native platform binary and must run inside the virtual machine space, there exist runtime overheads. Moreover, the existing mechanisms generate application program codes that are large or require heavy processing time. The problem is compounded with the continuously increasing number of device platforms and technology.

What is needed in the art is a framework that is required for development of applications independent of the platform of the device.

SUMMARY

The invention provides a platform-independent application development framework. The framework comprising: a content interface configured to provide an Application Programming Interface (API) to program an application, the application comprising a programming code to be executed on one or more platforms, wherein the API is independent of the one or more platforms; an application environment configured to provide an infrastructure to program the application, wherein the infrastructure is independent of the one or more platforms; and one or more plug-in interfaces configured to provide an interface between the application environment and the one or more platforms.

The invention further provides a platform-independent application development framework. The framework comprising: a content interface configured to provide an Application Programming Interface (API) to program an application, the application comprising a programming code to be executed on one or more mobile device platforms, wherein the API is independent of the one or more mobile device platforms; an application environment configured to provide an infrastructure to program the application, wherein the infrastructure is independent of the one or more mobile device platforms; and one or more plug-in interfaces configured to provide an interface between the application environment and the one or more mobile device platforms.

The invention further provides an architecture for platform-independent development of an application, the application comprising a programming code to be executed on one or more mobile device platforms, the architecture comprising: an abstraction layer configured to: provide an Application Programming Interface (API) to program the application, wherein the API is independent of the one or more mobile device platforms; provide an infrastructure to program the application, wherein the infrastructure is independent of the one or more mobile device platforms; and provide an interface between the abstraction layer and the one or more mobile device platforms.

The invention further provides a method for platform independent development of an application. The method comprising: providing an Application Programming Interface (API) to program an application, the application comprising a programming code to be executed on one or more platforms, wherein the API is independent of the one or more platforms; providing an infrastructure to program the application, wherein the infrastructure is independent of the one or more platforms; and providing an interface between the application environment and the one or more platforms.

An article of manufacture for platform independent development of an application, comprising: an electronically accessible medium including instructions, that when executed by a processor, cause the processor to: provide an Application Programming Interface (API) to program an application, the application comprising a programming code to be executed on one or more platforms, wherein the API is independent of the one or more platforms; provide an infrastructure to program the application, wherein the infrastructure is independent of the one or more platforms; and provide an interface between the application environment and the one or more platforms.

BRIEF DESCRIPTION OF THE DRAWINGS

Figure 1:
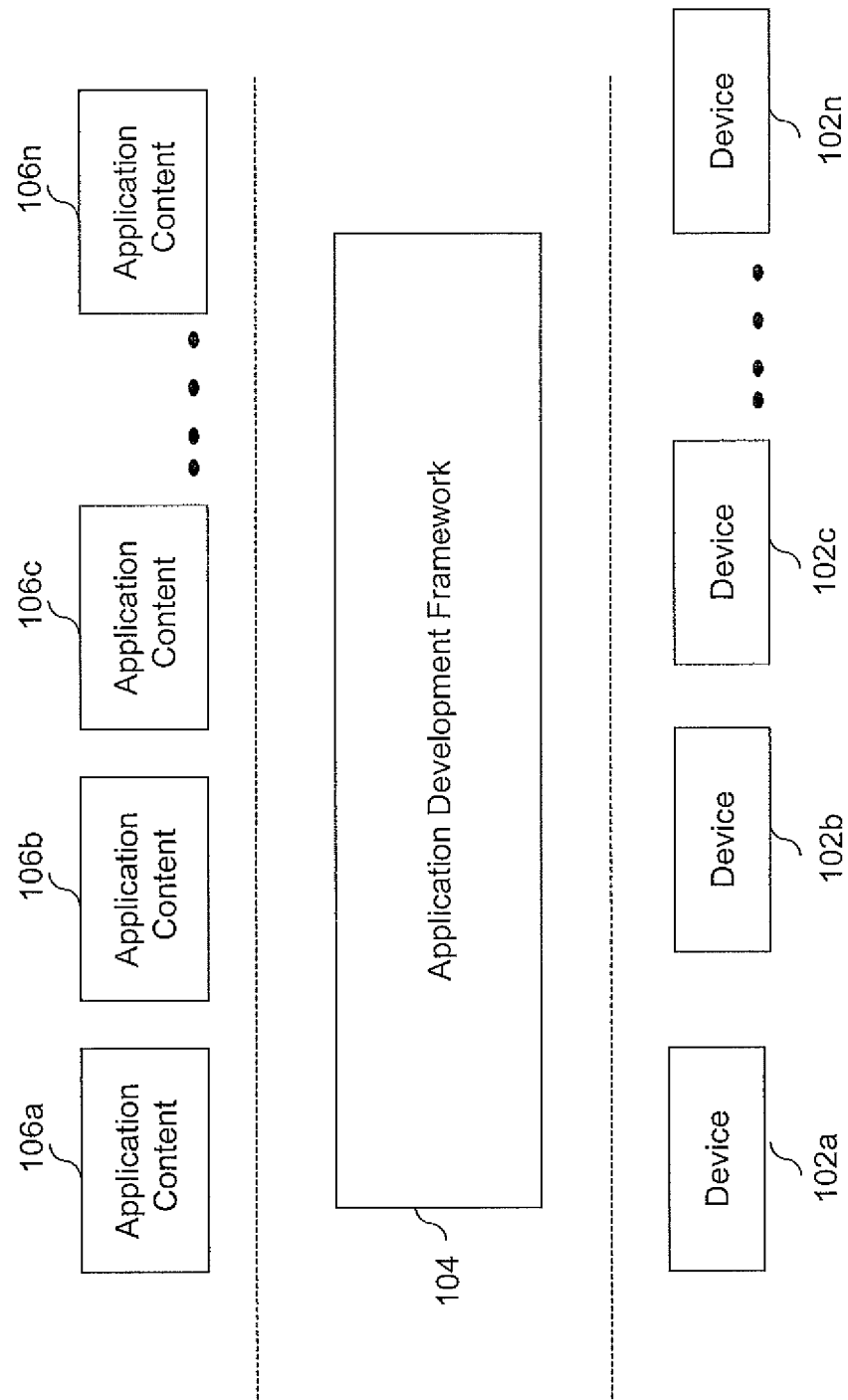
Figure 2:
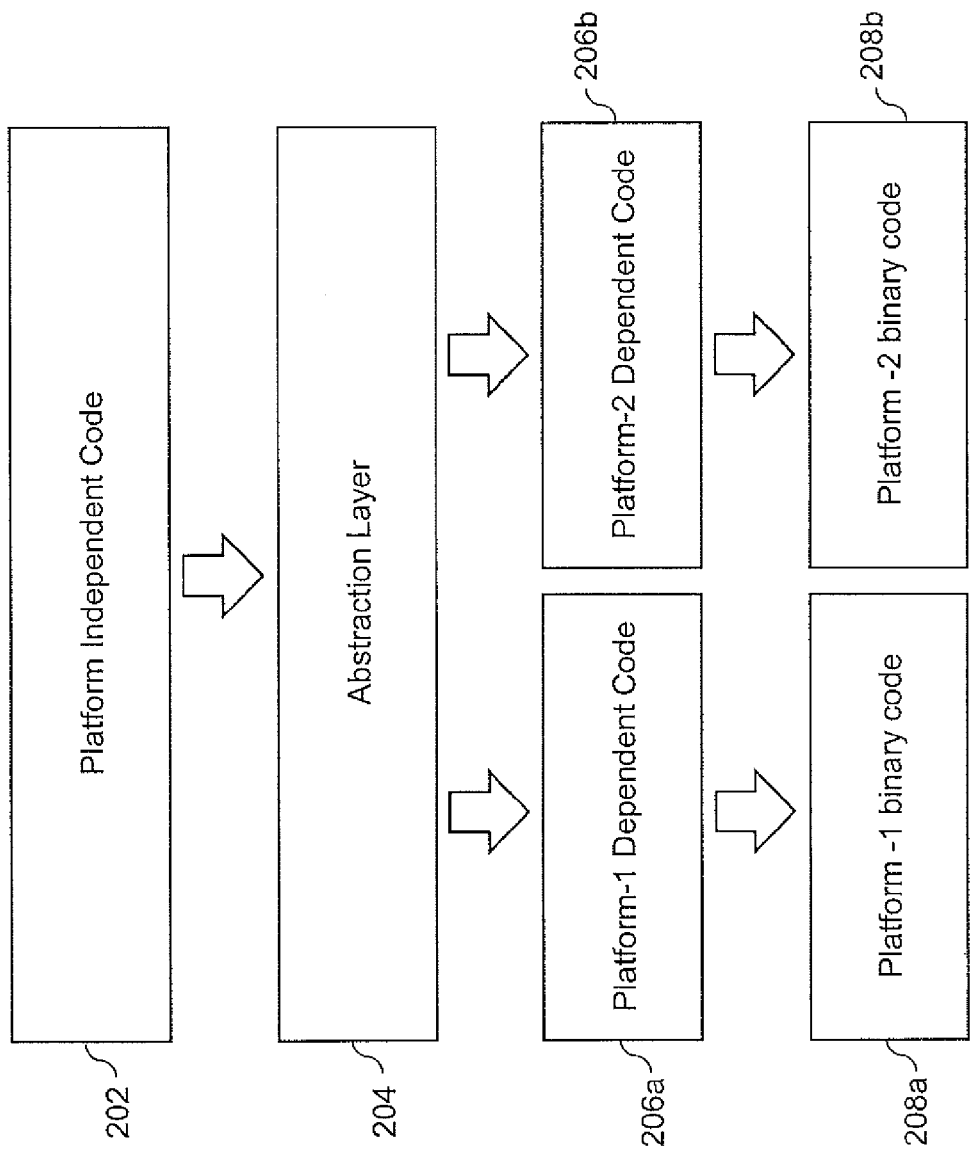
Figure 3:
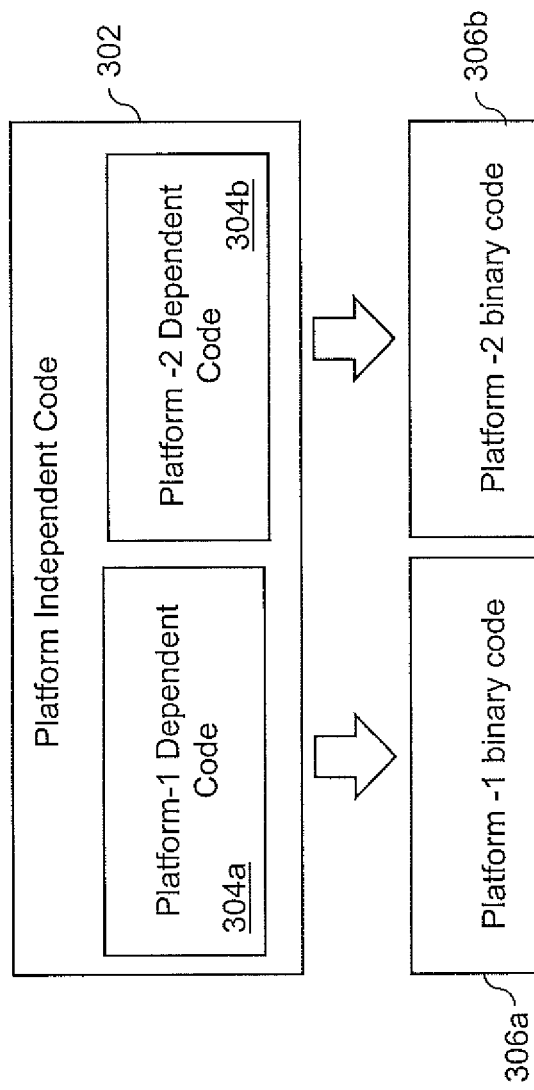
Figure 4:
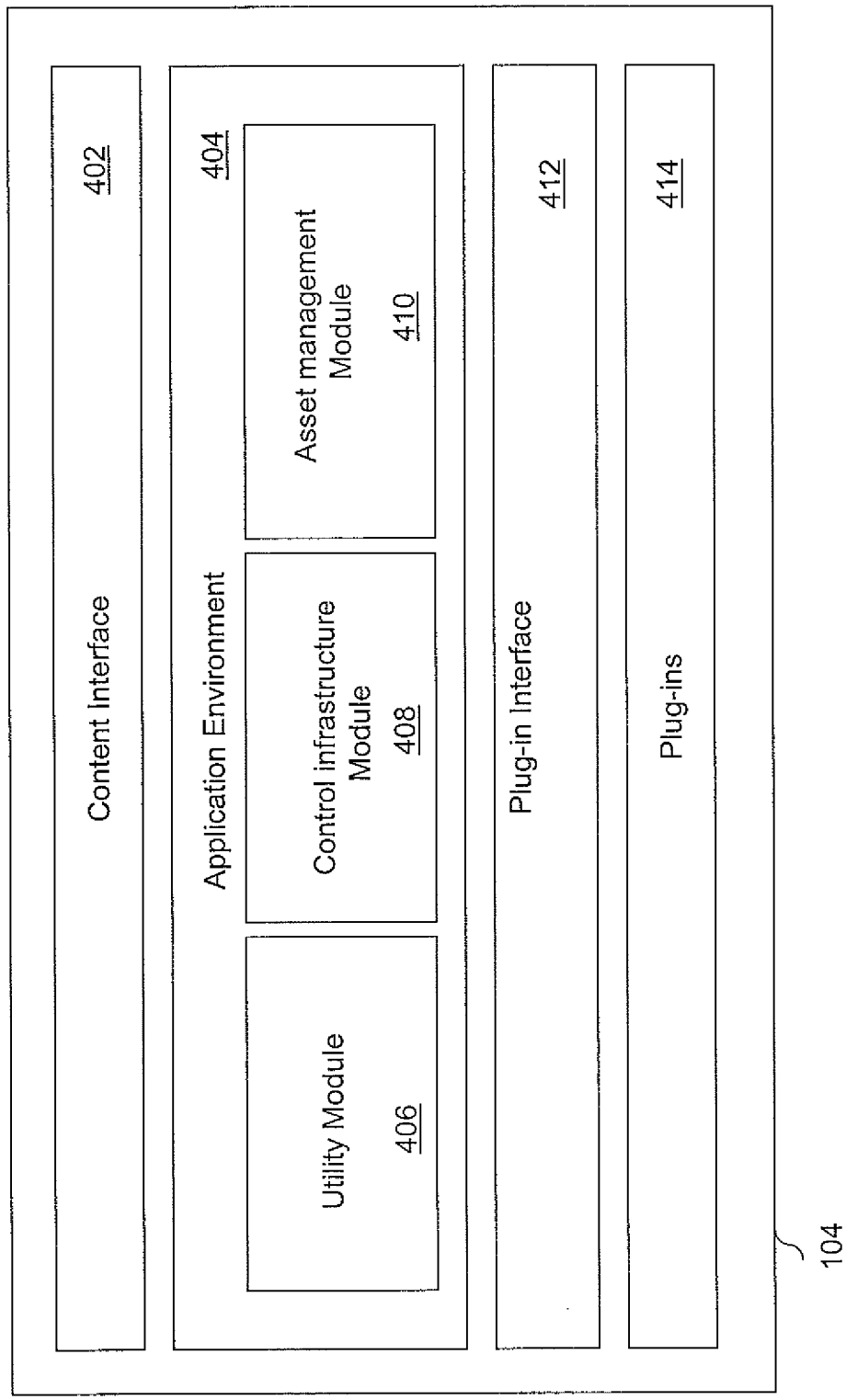
Figure 5:
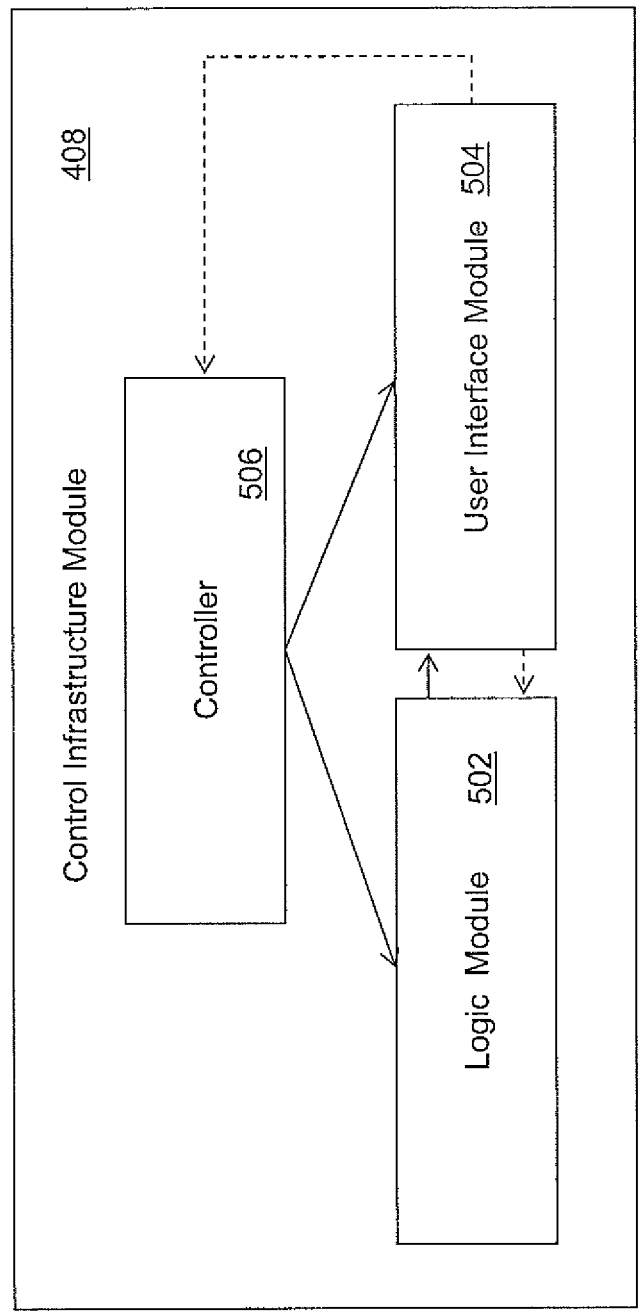
Figure 6:
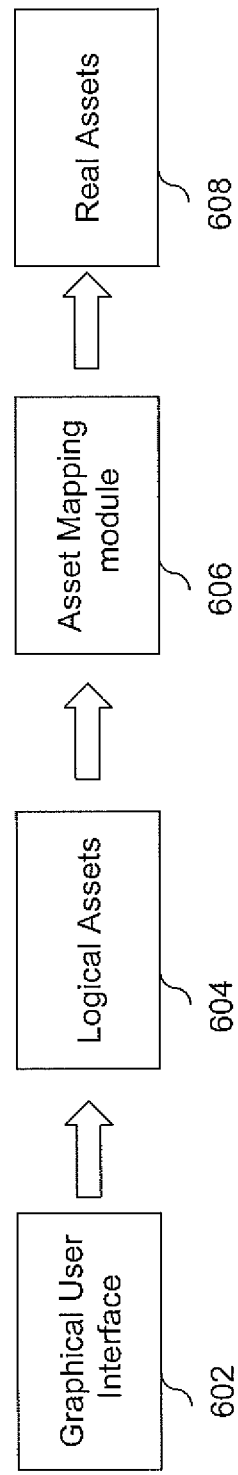
Figure 7:
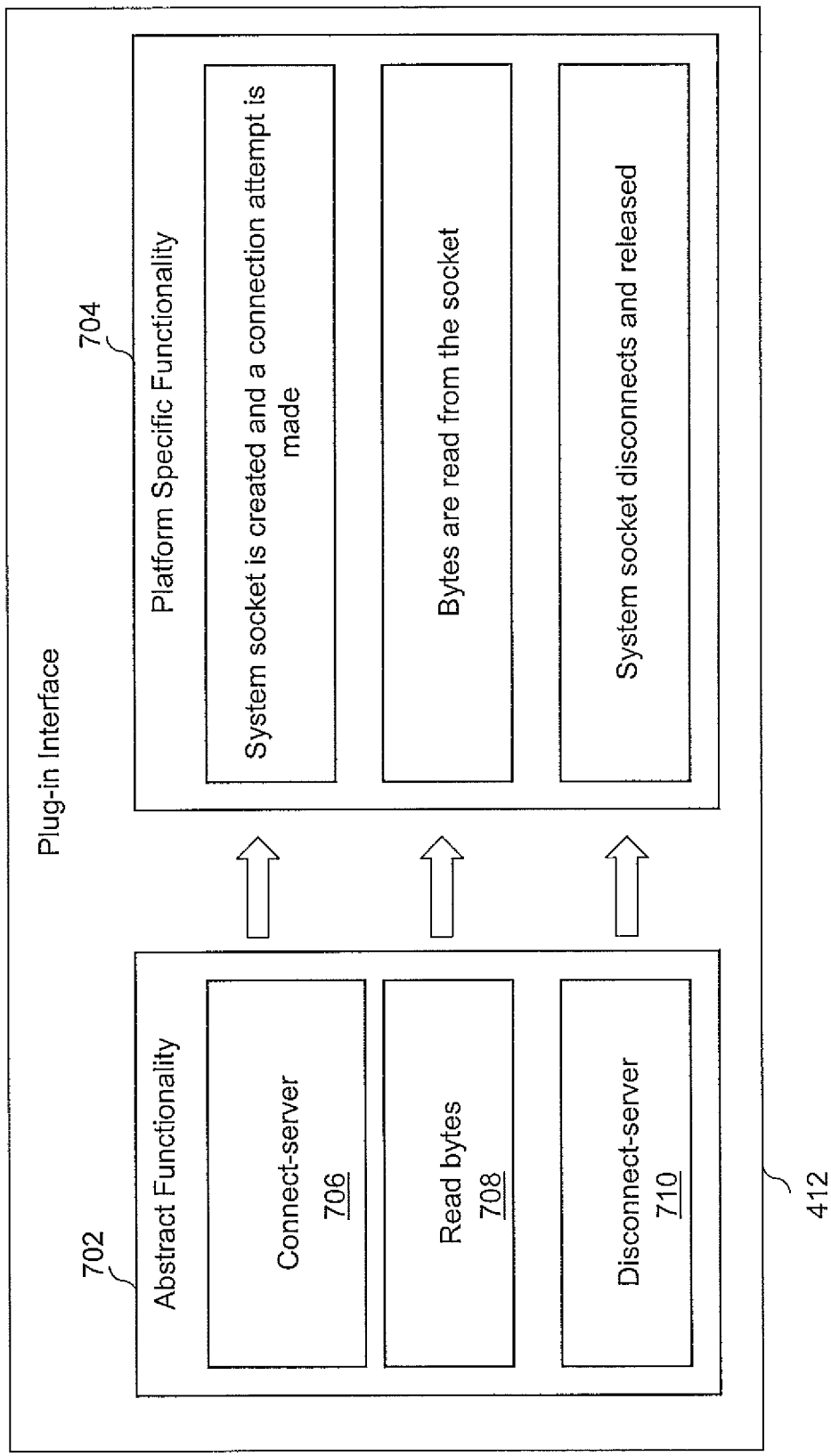

Having thus described the invention in general terms, reference will now be made to the accompanying drawings, which are not necessarily drawn to scale, and wherein:

FIG. 1 is a simplified block diagram of a platform independent development framework;

FIG. 2 shows functional overview of abstraction layer according to an embodiment of the invention;

FIG. 3 shows functional overview of pre-processor layer according to an embodiment of the invention;

FIG. 4 shows functional overview of a platform independent development framework according to an embodiment of the invention;

FIG. 5 shows functional overview of a control infrastructure module according to an embodiment of the invention;

FIG. 6 shows functional overview of a asset management module according to an embodiment of the invention; and FIG. 7 shows functional overview of a plug-in interface according to an embodiment of the invention.

Figure 8:
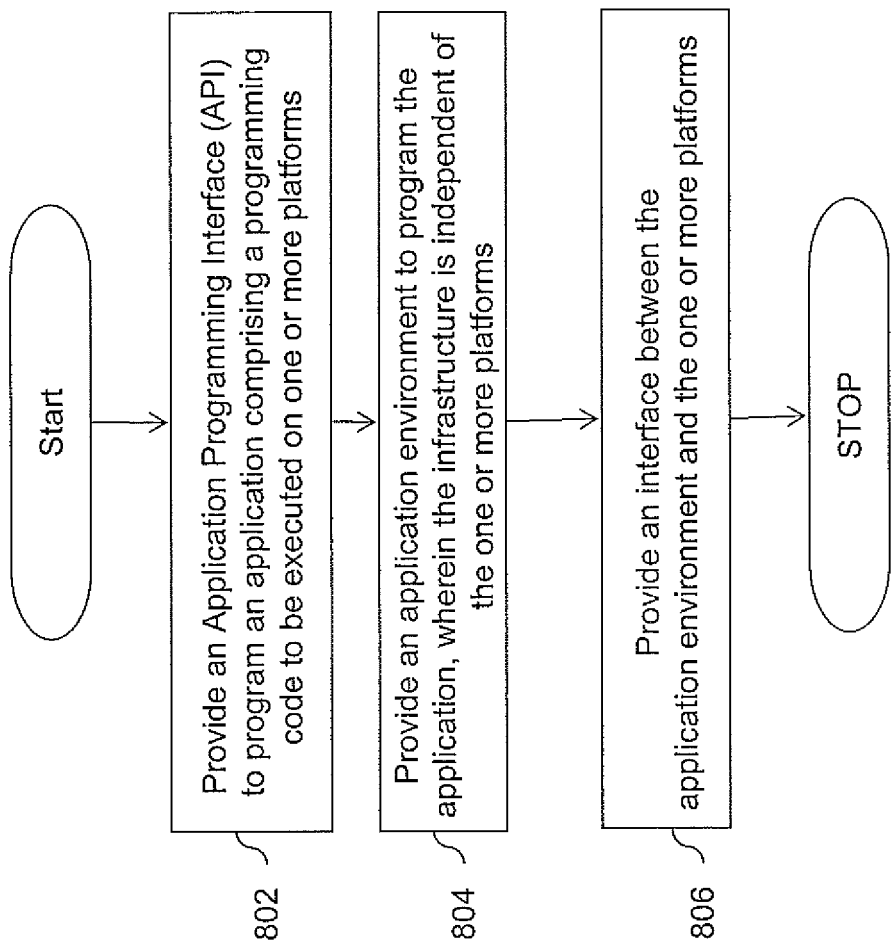

FIG. 8 is a flowchart illustrating the method for platform independent development of an application, according to an embodiment of the invention.

DETAILED DESCRIPTION OF THE INVENTION

Illustrative embodiments of the technology now will be described more fully hereinafter with reference to the accompanying drawings, in which some, but not all embodiments of the technology are shown. Indeed, the technology may be embodied in many different forms and should not be construed as limited to the embodiments set forth herein; rather, these embodiments are provided so that this disclosure will satisfy applicable legal requirements. Like numbers refer to like elements throughout.

As a preliminary matter before exploring details of various implementations, reference is made to FIG. 1 for illustrating a simplified block diagram of a platform independent development framework. FIG. 1 discloses a platform independent framework that allows a rapid platform independent application development, without the need for an application developer to know each platform. As shown in FIG. 1, devices 102a, 102b, 102c and 102n are connected through an application development framework 104, which in turn is connected to application contents 106a, 106b, 106c and 106n. Devices 102a-n can be, but not limited to a mobile device such as a cellular phone, a PDA and a smartphone, a laptop, a personal computer and the like. Examples of application contents 106a-n include a game, a message, a calendar, an address, a notepad, a user interface and other applications to be executed on devices 102a-n.

Devices 102a-n may have different hardware and software platforms. Examples of software platforms include operating systems such as Windows, Linux, Macintosh, Symbian, and so forth. Moreover, devices 102a-n may have different hardware such as the screen size, screen resolution, audio and video functionality, processors and so forth. Therefore, development of an application for each of these platforms may require application content 106a-n to be written in various programming languages and functions compatible with the platforms. For example, C++ programming language may be used by Windows applications, while JAVA programming language is primarily used for developing web applets. Moreover, the resources required for each platform may be different. For example, the type and size of an image to be displayed may vary based on the screen size and screen resolution of devices 102a-n. Therefore, application contents 106a-n may be developed based on the platform of devices 102a-n.

Application development framework 104 provides a mechanism for developing application contents 106a-n for devices 102a-n independently across multiple device platforms. Therefore, application contents 106a-n developed using application development framework 104 is programmed only once and can be used on various platforms of devices 102a-n. In an embodiment of the invention, application development framework 104 enables application content 106a-n to be developed based on platform specific requirement and platform independent requirements. In another embodiment of the invention, application development framework 104 provides cross-translation of programming languages for various device platforms.

In case of conventional development or porting of applications, the number of coding modules for 'n' number of applications and 'm' number of devices can be n*m. For example, when 4 applications are developed for 10 different platforms of devices, then a total of 40 coding modules for applications have to be developed. As is evident from the above calculations, the number of coding modules increases tremendously with increase in the number of applications and the type of device platforms. However, in case of applications developed through platform-independent application development framework 104, the number of coding modules can be n+m. For example, the application logic can be written in platform independent code by using Application Programming Interface (API) provided by application development framework 104. Therefore, 'n' number of platform independent logics is required for 'n' number of applications. Similarly, using application development framework 104 can also program the platform specific programming code for 'm' number of devices. Therefore, 'm' number of platform specific coding modules is required for 'm' number of devices. As a result, a total of m+n. For example, when 4 applications are developed for 10 different platforms of devices by using application development framework 104, then a total of 14 coding modules for applications have to be developed. As a result, the complexity of the programming code and development time can be reduced.

Application development framework 104 uses abstraction layer and pre-processor functionalities to enable the programming code to be developed independent of the device platforms. The abstraction layer and pre-processor functionalities are described in detail in conjunction with FIGS. 2 and 3 respectively.

FIG. 2 shows functional overview of an abstraction layer 204 according to an embodiment of the invention. Generally, in the domain of software programming, an abstraction layer enables separation of various details or functionalities of a programming code from the device platform requirements. Abstraction layer 204 in the platform-independent development architecture separates platform independent code 202 from platform dependent codes 206a-b of an application. For example, platform independent code 202 may be the logic of the application and platform dependent codes 206a-b can be the programming code specific to devices 102. Therefore, a developer that works on the logic or platform engine of the application may not require knowledge about the device interface. Moreover, the developer that works on the application itself may not require the knowledge about the device platform.

Platform independent code 202 and platform dependent codes 206a-b are developed by using API provided by application development framework 104. In an embodiment of the invention, platform independent code 202 and platform dependent codes 206a-b are parts of application content 106a-n. Platform dependent code 206a-b can be developed based on the native language of the specific platforms. The complete code of the application that contains the platform independent code 202 and platform dependent code 206a-b may be compiled to generate a binary codes 208a-b for the device platforms. Therefore, the application developed contains the complete code and any additional component or code is not required. Moreover, the processing overheard is low, because the application code is compiled into native binary code of the platform. In an embodiment of the invention, application development framework 104 implements abstraction layer 204 during the run-time of the application.

Abstraction layer 204 further provides infrastructure for the development of the application. The infrastructure provided by abstraction layer 204 includes various utilities, data structures, tools, design options, and resources required to develop the application. Examples of data structures and utilities include a set of collections like arrays and dictionaries, and examples of tools include Extensible Markup Language (XML) parsing, unicode string support and so forth. Examples of resources include images, sounds, videos and various other assets required by the application. In an embodiment of the invention, abstraction layer 204 includes different modules to develop the application. Examples of modules include, but are not limited to, networking, file support, rendering, resource loading, system events, system properties, and resource manipulation. Each of the modules provided by abstraction layer 204 include a common functionality, and a device platform specific functionality. The device platform specific functionality is implemented in the device plug-in and is explained in detail in conjunction with FIG. 7.

FIG. 3 shows functional overview of pre-processor functionality according to an embodiment of the invention. Generally, a pre-processor processes an input data to produce an output to be used as input to a computer program. In case of pre-processor manipulation, tags are embedded inside the application code. The tags instruct the compiler on the sections to be compiled for different platforms. Therefore, as shown in FIG. 3, application programming code comprises platform independent code 302 and that in turn comprises platform dependent codes 304a-b. The application programming code is compiled by a complier to generate native binary codes 306a-b. Binary codes 306a-b can then be executed on the specific device platforms for which the code has been compiled. There are no layers between platform dependent codes 304a-b and platform independent code 302, therefore no runtime overhead is introduced in the execution of the programming code.

Application development framework 104 implements pre-processor for device platform specific compilation of application code. In an embodiment of the invention, pre-processor functionality is implemented to map logical resources and the real resources based on the device platform. As a result, the binary codes only include needed resources and therefore, the overhead for mapping is lower. Examples of resources include images, sounds, video and so forth. Moreover, the pre-processor functionality can be used to override implementation of application for a specific device inside the same device platform family. For example, a specific model of a mobile device of the Windows Mobile platform may have a different screen resolution for displaying images. Therefore, the Graphical User Interface (GUI) can be tailored for the specific device platform by using pre-processor functionality. Moreover, the pre-processor is used for translation of the programming code across different programming languages. For example, the programming code of a game may be for a mobile phone that only supports JAVA programming language.

FIG. 4 shows functional overview of platform-independent Application Development Framework (ADF) 104 according to an embodiment of the invention. ADF 104 comprises content interface 402, application environment 404, plug-in interface 412, plug-ins 414.

Content interface 402 provides the API for developing the application in ADF 104. Further, content interface 402 includes application specific logic, GUI logic, various assets such as images, sounds, fonts, texts, coordinates etc., and other optional modules. Content interface 402 enables the developer to select the modules for developing an application. The modules provided by content interface 402 are part of abstraction layer 204, and hence, they are independent from the platform and application. Examples of modules include but are not limited to, gaming module and social network module.

Application Environment (AE) 404 provides infrastructure to program the application. Examples of infrastructure include design options, utilities and tools that enable the creation of applications. AE 404 is a part of abstraction layer 204, and hence, is independent from the platform of devices. AE 404 comprises a utility module 406, a control infrastructure module 408, and an asset management module 410. Utility module 406 provides multiple utilities and data structures for developing applications. The utilities and data structures provided by utility module 406 can be used for platform independent application development of application logic, GUI and other parts of the application. Examples of utilities and data structures provided by utility module 406 include but are not limited to collections of arrays, vector, dictionary and the like, data types, GUI data types such as point, rectangle and the like, eXtensible Markup Language (XML) support, document object models, file support, logging support, random number generators, serialize support, string manipulation, time, time formatting support and so forth.

Control infrastructure module 408 of AE 404 controls and manages the flow of application in ADF 104. Control infrastructure module 408 implements a Model-View-Controller (MVC) architecture in which a controller is split into logical modules or sub-controllers that communicate among them and with the main controller using events. The use of MVC architecture allows separation between the application logic and GUI. Further, control infrastructure module 408 enables the display and handling of the GUI and application logic. The various components and functionality of control infrastructure module 408 are explained in detail in conjunction with FIG. 5.

Asset management module 410 of AE 404 manages various assets for the application. Examples of assets include but are not limited to images, sounds, videos, other GUI related requirements for a platform, and so forth. Further, asset management module 410 allows developing a different GUIs for different types of device screen, which includes support for different resolutions, orientations, and parameters like keypad only and/or with mouse support etc. Furthermore, asset management module 410 enables the use of different asset formats per device platform. For example, one device platform can use MP3 files and another can use WAV. Therefore, assets can be used inside a generic code for development of platform independent application. In an embodiment of the invention, asset management module 410 is implemented at pre-processing stage. As a result, the binary generated at pre-processor only includes the required assets, and hence, the processing overhead is reduced. The operation of asset management module 410 is explained in detail, in conjunction with FIG. 6.

Plug-in interface 412 provides interfaces between AE 404 and device platforms. Plug-in interfaces provide system events, and optional interfaces like rich media support for development of the applications. Plug-in interface 412 is used when platform specific functionality is required for an application. Plug-in interface 412 use plug-ins 414 to provide interface between AE 404 and device platforms. Plug-ins 414 are computer programs that provide platform specific functionality required to be implemented to add support for the platforms. Plug-in interface 412 includes various modules such as system flow, system events, system properties, networking file support, rendering, resource loading, resource manipulation and so forth. In an embodiment of the invention, each of these modules has a common functionality that is implemented in abstraction layer 204 and a platform specific functionality that is implemented in plug-ins 414. In an embodiment of the invention, in case certain platform functionality is not supported by a platform, then the functionality is emulated. Moreover, AE 404 notifies the application in case a particular functionality cannot be supported. For example, video playback functionality may not be supported on a low-end mobile device. Exemplary functioning of plug-in infrastructure is explained in detail in conjunction with FIG. 7.

FIG. 5 shows functional overview of control infrastructure module 408 according to an embodiment of the invention. Control infrastructure module 408 includes a controller 506, a logic module 502, and a user interface module 504. Control infrastructure module 408 implements Model-View-Controller (MVC) architecture. Control infrastructure module 408 isolates business logic from GUI considerations. Logic module 502 comprises the logic data of the application. The data of the application can be split among different objects, collections and structures. Logic module 502 communicates with controller 506 and user interface module 504 to provide the data for the application. In an embodiment of the invention, logic module 502 corresponds to the model in the MVC architecture. User interface module 504 provides GUI to display a complete or partial data from logic module 502. Moreover, user interface module can display additional items, for example in the case of games, the animations and transitions.

Controller 506 controls the flow of the application. Controller 506 processes and responds to events, for example a user action. Moreover, controller 506 decides various events such as when to show a screen, when to change or update the logic module 502 and so forth. In an embodiment of the invention, control infrastructure module 408 may comprise multiple sub-controllers under controller 506. Each of the sub-controllers may be responsible for a single module or part of the logic. In an embodiment of the invention, sub-controllers can dispatch events to controller 506 that acts as a state machine. Subsequently, based on these events, controller 506 can start or stop sub-controllers or modules. User interface module 504 and controller 506 can communicate via asynchronous events. In another embodiment of the invention, events that are dispatched from user interface module 504 and from the network are handled by controller 506 and the sub-controllers. The sub-controllers can then decide to update the logic module 502, move to the next state in the application etc. Controller 506 and the sub-controllers can also dispatch events to the user interface module 504. For example, controller 506 may dispatch an event to start an animation. The use of events between the user interface module 504 and controller 506 provides better separation between their corresponding functionalities. Moreover, the developer of the application may use only logic model 502 and user interface module 504. Therefore, the developer may not program controller 506. As a result, the design of the application is cleaner and more flexible.

FIG. 6 shows functional overview of asset management module 410 according to an embodiment of the invention. The screens of different devices platforms can typically be categorized into computers, touch screens devices, or mobile devices with only key navigation. Further, each of the device platforms may have different screen resolutions. Asset management module 410 provides assets based on the device platforms and screen capabilities. Examples of real assets 608 include but are not limited to images, sounds, videos, and other GUI related requirements for a platform, and so forth. In an embodiment of the invention, different assets are split based on different screen families and resolutions to generate logical assets 604 for a GUI 602 by asset management module 410. The developer of the application only uses logical assets 604. Therefore, the real asset can be modified or tailored for a device platform, while the logical use of the asset remains the same. Further, asset management module 410 provides a mapping between logical assets 604 and real assets 608. Therefore, two different platforms that share the same screen family or resolutions use exactly the same logical assets 604. As a result, the same application will look identical on both the platforms. However, the developer can customize the look for a specific device platform. In an embodiment of the invention, the developer can customize the GUI based on the device platform fragmentations. Therefore, the flexibility in developing the application is increased.

Asset-mapping module 606 defines which logical assets 604 are used by each screen family or resolution combination. In an embodiment of the invention, asset-mapping module 606 includes a set of scripts for mapping logical assets 604 to real assets 608. The scripts provided by asset-mapping module 606 are managed through a GUI editor. In an embodiment of the invention, the scripts provided by asset-mapping module 606 are managed manually. In an embodiment of the invention, logical identifiers are associated with logical assets 604. Asset-mapping module 606 maps logical assets 604 to real assets 608 based on the logical identifiers. Examples of logical identifier include the name, location, size, or characteristics of logical assets 604.

In an embodiment of the invention, GUI customization of real assets 608 is done in the pre-processing stage. As a result, runtime overhead for executing the application is less. However, parts of the GUI can also be customized during runtime. For example, the application can ask AE 404 for the platform resolution, family, orientation etc., and then make decisions based on it. In an embodiment of the invention, real assets 608 are maintained in a single lossless format. For example, images are maintained in a PNG format. Real assets 608 are converted to platform specific format during the pre-processor stage. Therefore, no runtime overhead is encountered. Moreover, multiple real assets 608 in different formats for the same screen resolution are not required to be maintained.

FIG. 7 shows exemplary functional overview of plug-in interface 412 according to an embodiment of the invention. Plug-in interface 412 is used when platform specific functionality is required for an application.

Exemplary flow for reading a number of bytes of data from a web server is illustrated in FIG. 7, to explain the function of plug-in interface 412. In an embodiment of the invention, the files module is used to provide network connectivity. The file module has two main components: an abstract functionality 702 and a plug-in platform specific functionality 704. Abstract functionality 702 includes various functions that are independent of the device platform. For illustration purposes, in case of networking the functions in abstract functionality 702 include connect-server function 706, read bytes function 708, and disconnect-server function 710.

As shown, connect-server function 706 interfaces with platform specific functionality 704 to create a system socket and attempts to make a connection. Similarly, read bytes function 708 interfaces with platform specific functionality 704 to read bytes from the socket. The disconnect-server function 710 disconnects and releases the system socket. The developer may use only abstract functionalities 702 of ADF 104, which are automatically translated to platform specific functionalities 702.

FIG. 8 is a flowchart illustrating the method for platform independent development of an application, according to an embodiment of the invention. At step 802, an Application Programming Interface (API) is provided to program an application comprising a programming code. The programming code can be executed on multiple platforms. In an embodiment of the invention, the multiple platforms include mobile device platforms. Examples of the application include, but are not limited to, an online game for mobile devices, a messaging application, a chat application and so forth. The API is independent of device platform and is provided by ADF 104. Thereafter, at step 804, application environment 404 is provided to program the application. Application environment 404 provides and infrastructure that is independent of the device platforms. Infrastructure includes various utilities, data structures, tools, modules, assets and other resources or modules required for developing or executing the application. Subsequently, at step 806, an interface is provided between application environment 404 and the device platforms. In an embodiment of the invention, the interface is provided by plug-in interface 412.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. Furthermore, such computer program instructions may be made available for download and/or downloaded over a communication network.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of providing an application development framework for platform independent development of an application, comprising:
   providing an Application Programming Interface (API) of the application development framework to program an application, the application comprising programming code to be executed on one or more platforms, wherein the API is independent of the one or more platforms;
   providing an application environment of the application development framework to provide an infrastructure to program the application, wherein the infrastructure is independent of the one or more platforms; and
   providing one or more interfaces of the application development framework between the application environment and the one or more platforms, a respective interface comprising a plug-in interface configured to provide platform-specific functionality for the application, wherein the plug-in interface is configured to use plug-in software modules configured to provide platform-specific capabilities, wherein the plug-in interface is configured to transform one or more abstract functionalities included in the application, and which are independent of a specific platform, to one or more corresponding platform-specific functionalities, and wherein the plug-in interface includes modules having common functionalities implemented by an abstraction layer of the application development framework and platform-specific functionalities implemented by the plug-in software modules, if available, or emulation, if there is no corresponding plug-in software module;
   wherein the application, with the one or more platform-specific functionalities transformed by the plug-in interface, is configured for compilation to platform-specific executable binary code configured for execution by a specific platform.

2. The method of claim 1, wherein providing the API comprises providing one or more assets to program the application.

3. The method of claim 1, further comprising providing one or more modules for programming the application.

4. The method of claim 1, further comprising providing one or more logical assets.

5. The method of claim 1, further comprising downloading computer-executable instructions that, if executed on a computer, cause the computer to implement said providing an API, said providing an application environment, and said providing one or more interfaces.

6. The method of claim 1, further comprising providing for download computer-executable instructions that, if executed on a computer, cause the computer to implement said providing an API, said providing an application environment, and said providing one or more interfaces.

7. The method of claim 1, wherein the abstraction layer is configured to enable separation of platform-dependent code and platform-independent code.

8. A non-transitory computer-readable medium having stored thereon computer-executable instructions that, if executed by a computing device, result in the implementation of operations comprising:

provided an Application Programming Interface (API) of an application development framework to program an application, the application comprising programming code to be executed on one or more platforms, wherein the API is independent of the one or more platforms;

providing an application environment of the application development framework to provide an infrastructure to program the application, wherein the infrastructure is independent of the one or more platforms; and providing one or more interfaces of the application development framework between the application environment and the one or more platforms, a respective interface comprising a plug-in interface configured to provide platform-specific functionality for the application, wherein the plug-in interface is configured to use plug-in software modules configured to provide platform-specific capabilities, wherein the plug-in interface is configured to transform one or more abstract functionalities included in the application, and which are independent of a specific platform, to one or more corresponding platform-specific functionalities and wherein the plug-in interface includes modules having common functionalities implemented by an abstraction layer of the application development framework and platform-specific functionalities implemented by the plug-in software modules, if available, or emulation if there is no corresponding plug-in software module;

wherein the application, with the one or more platform-specific functionalities transformed by the plug-in interface, is configured for compilation to platform-specific executable binary code configured for execution by a specific platform.

9. The non-transitory computer-readable medium of claim 8, wherein providing the API comprises providing one or more assets to program the application.

10. The non-transitory computer-readable medium of claim 8, wherein providing the API comprises providing one or more modules for programming the application.

11. The non-transitory computer-readable medium of claim 8, wherein the abstraction layer is configured to enable separation of platform-dependent code and platform-independent code.

12. An apparatus for implementing an application development framework comprising:

at least one computing device; and at least one computer-readable medium coupled to the at least one computing device and having stored thereon computer-executable instructions that, if executed by the at least one computing device, result in the implementation of operations comprising:

providing an Application Programming Interface (API) of the application development framework to program an application, the application comprising programming code to be executed on one or more platforms, wherein the API is independent of the one or more platforms;

providing an application environment of the application development framework to provide an infrastructure to program the application, wherein the infrastructure is independent of the one or more platforms; and providing one or more interfaces of the application development framework between the application environment and the one or more platforms, a respective interface comprising a plug-in interface configured to provide platform-specific functionality for the application, wherein the plug-in interface is configured to use plug-in software modules configured to provide platform-specific capabilities, wherein the plug-in interface is configured to transform one or more abstract functionalities included in the application, and which are independent of a specific platform, to one or more corresponding platform-specific functionalities, and wherein the plug-in interface includes modules having common functionalities implemented by an abstraction layer of the application development framework and platform-specific functionalities implemented by the plug-in software modules, if available, or emulation, if there is no corresponding plug-in software module;

wherein the application, with the one or more platform-specific functionalities transformed by the plug-in interface, is configured for compilation to platform-specific executable binary code configured for execution by a specific platform.

13. The apparatus of claim 12, wherein providing the API comprises providing one or more assets to program the application.

14. The apparatus of claim 12, wherein providing the API comprises providing one or more modules for programming the application.

15. The apparatus of claim 12, wherein the abstraction layer is configured to enable separation of platform-dependent code and platform-independent code.

* * * * *